(No Model.)
J. C. HENRY.
CONTROLLER FOR ELECTRIC CARS.
No. 597,374. Patented Jan. 11, 1898.
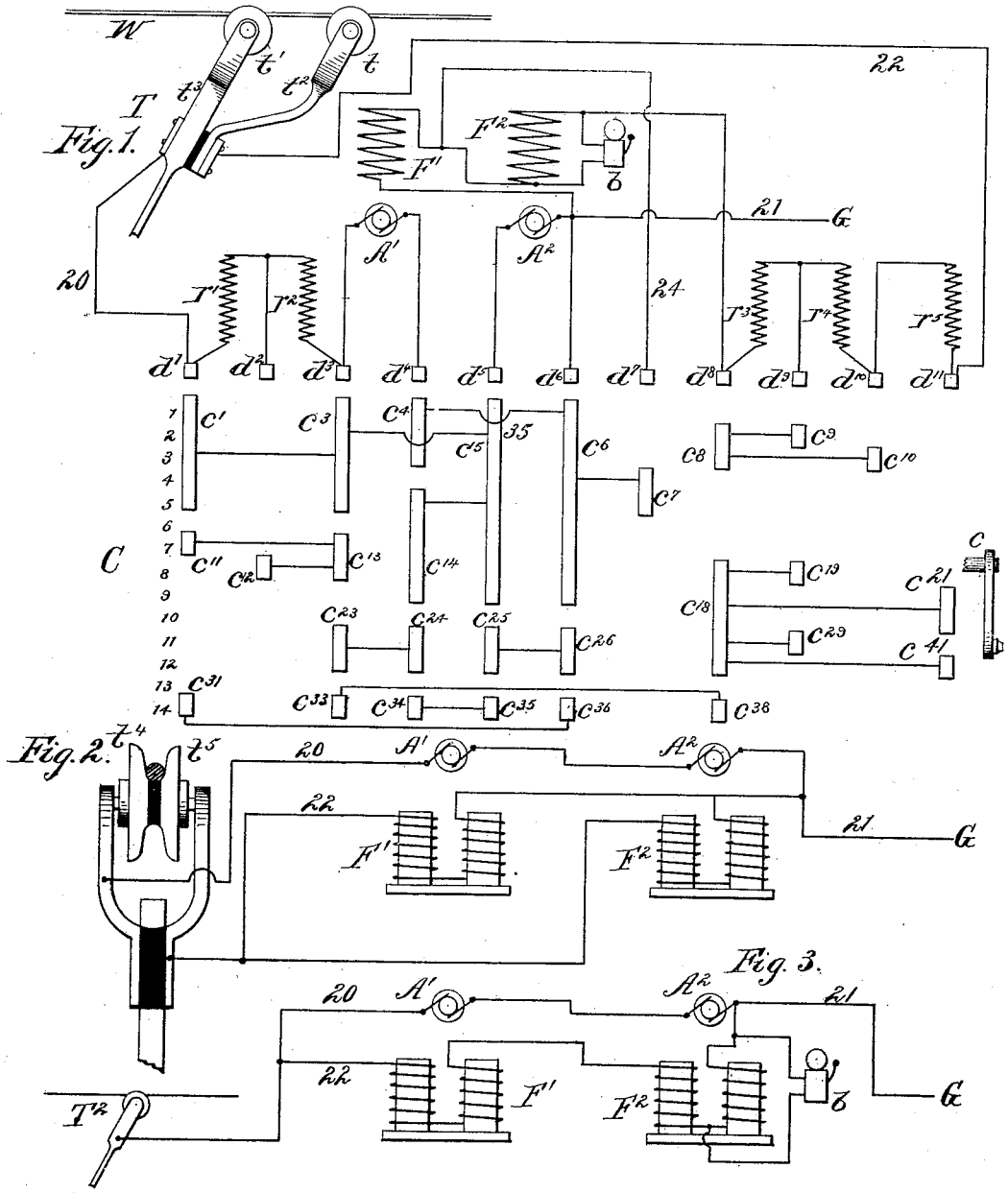
WITNESS
INVENTOR
John C. Henry

UNITED STATES PATENT OFFICE.

JOHN C. HENRY, OF DENVER, COLORADO.

CONTROLLER FOR ELECTRIC CARS.

SPECIFICATION forming part of Letters Patent No. 597,374, dated January 11, 1898.

Application filed November 6, 1897. Serial No. 657,650. (No model.)

*To all whom it may concern:*

Be it known that I, JOHN C. HENRY, a citizen of the United States, residing at Denver, county of Arapahoe, State of Colorado, have invented certain new and useful Improvements in Electric Railways, of which the following is a specification.

This invention relates to improvements in electric railways, and has more particularly in view improvements in the controlling and braking of electric cars. In Patent No. 591,100, issued to me on October 5, 1897, I describe a system wherein the motors are supplied with current from various sources of electric supply of different voltages and wherein they are also used to generate a current which contributes to the dynamo efforts when it becomes desirable to absorb mechanical energy, as in the case where the cars are descending grades or are being stopped. In the system described in said patent the field-magnets of the motors are in a shunt or independent circuit from the armatures thereof, thereby enabling the counter electromotive force of the motors to be varied by adjustment of the current in said field-magnets, so as to cause the motors under certain conditions of operation to act as generators in supplying electricity to the line and absorbing mechanical energy. In applying such a system of control to an electric-railway system in which there is only one supply-circuit I have found it desirable to introduce additional means of control hereinafter set forth. In this system the controller is so arranged that the larger part of the speed changes can be made without waste of energy in resistances in the armature-circuit. The field-magnets are excited by a branch circuit separate and independent from the armature-circuit and containing resistances and contacts controlled by the controller to vary the resistance of this branch circuit. The controller also changes the connection of the armatures of the motors from series to parallel, or vice versa, and by means of these two operations effected by the controller—namely, the regulation of the field-exciting current and the series parallel control—a very wide range of speed-control is possible. This control is, however, extended and rendered more even and gradual by the use of variable resistances in the armature-circuit, also controlled by the controller. With such a system the voltages of the motors may be readily varied, so that they will receive electrical energy from the trolley-line or deliver energy to it. It will therefore be understood that the speed of the car may be quickly decreased when the motors are adjusted to work as dynamos, as may readily be effected by increasing their voltage above that of the line and maintaining it so as the car slows up by increasing the field strength and by changing from parallel to series. A limit to this will, however, be reached when the motion of the car becomes so slow that the motors are no longer capable of overcoming the line potential and it becomes necessary to adopt other means of braking the car. For this purpose in my present controller one or both of the armatures are at this stage short-circuited, and thus under the action of the separately-excited field-magnets exert a powerful drag upon the car and soon bring it to a stop and may even hold it upon a grade. The controller also provides, as a guard against accidents when the connection with the source of electric supply is lost, a connection whereby the motors are made to operate as shunt-wound generators working through a predetermined or variable resistance.

In ordinary practice on five-hundred-volt lines when the circuit is broken the insulation strain caused by the back kick from the field-magnets can readily be provided for by allowing it to discharge through the armature, as it naturally would when the armatures and fields are in parallel connections. In such a case the arc at the trolley or switch when the circuit is broken is very small as compared with that which results when series motors are used. When higher potentials are employed, however, it becomes desirable to relieve the motors from the strain on the insulation caused by the induced current which occurs when the circuit is broken. In such cases I prefer to have the force of this induced current expended at the trolley or line switch, and for this purpose I provide a novel form of trolley, which breaks the parallel connection between the armatures and field-magnets the instant that the trolley leaves the wire.

In order to notify the motorman when he has lost current, I provide an alarm-bell arranged to operate only at the instant the current ceases to flow.

In the accompanying drawings, Figure 1 is a diagram of a car equipment and controller therefor. Figs. 2 and 3 are diagrams showing modifications.

In Fig. 1, W represents the trolley-wire or supply-wire, and T the trolley. C is the diagrammatic development of the controller, $c$ representing the handle, and $c'$ $c^2$ $c^3$, &c., the contacts thereof. These contacts are mounted in well-known manner on a cylinder of insulating material operated by handle $c$ and are adapted to engage with fixed contacts $d'$ $d^2$ $d^3$, &c., which are connected to the resistances $r'$ $r^2$ $r^3$ $r^4$ $r^5$, to armatures $A'$ and $A^2$ and field-magnets $F'$ and $F^2$ of the two motors, to the trolley T or line connection, and to ground G.

It will be understood that in applying this invention to any particular car equipment, such as are now used, the usual reversing, cut-out, and other switches and devices would be retained and connected up in the usual manner. I have indicated in the drawings only the parts and connections which are distinctive of and essential to my improvement.

From the trolley T connection is made by separate branches or circuits on the one hand to the field-magnets $F'$ $F^2$ and on the other hand to the armatures $A'$ $A^2$ of the motors. In Fig. 1 I have shown the trolley formed with two separate contact-wheels $t$ $t'$, supported in forks $t^2$ $t^3$, which are mechanically attached to one another, but electrically insulated, the field-magnet connection 22 leading from wheel $t$ and the armature connection 20 from wheel $t'$.

The controller-contacts $c'$ $c^2$ (indicated in Fig. 1) are by the operation of the controller-handle brought successively under the contacts $d'$ $d^2$, &c., the figures at the left of the drawings indicating the successive positions of the line of contact which in any one position of the controller will in this diagram be in the horizontal line drawn from the number corresponding to that position. Thus in position 1, indicated, the controller is making contact at $c'$ $c^3$ $c^4$ $c^5$ $c^6$, thus establishing the circuits for the armatures and field-magnets of the motors as follows: from trolley-wheel $t'$, wire 20, contacts $d'$ and $c'$ through the controller to contacts $c^3$ $d^3$, where the current divides, part passing through armature $A'$ to contact $d^4$, and thence through the controller to contact $d^6$, and through ground connection 21 to ground, and the other part passing from controller-contact $c^3$ through the controller to contacts $c^5$ $d^5$, thence through armature A to ground connection 21. Another circuit may be traced from trolley-wheel $t$ through wire 22 to contact $d^{11}$, and thence through resistances $r^5$ $r^4$ $r^3$ to contact $d^8$, thence through field-magnets $F^2$ and $F'$ to ground connection 21. The controller therefore in this position puts the armatures of the motors in multiple in direct connection to the line with the field-magnets in series in a separate branch circuit, including resistances $r^3$ $r^4$ $r^5$, so as to give a weak field. This will cause the motors to operate at their highest speed, this being ordinarily called the "last" point or position of the controller, but being here numbered 70 as the first point for convenience of description.

Supposing now it is desired to stop or retard the motion of the car, the controller being shifted to position 2, the contacts made by it are unchanged, except that additional contacts $c^8$ and $c^9$ are brought into action, thereby short-circuiting resistance $r^3$, which is connected across contacts $d^8$ $d^9$. This decrease of resistance in the field-magnet circuit causes an increase in the current exciting the field-magnets, and thereby increases the counter electromotive force of the motors and enables said motors to overcome the line potential and supply electrical energy to the line, while themselves absorbing mechanical energy. As the car slows up it is necessary to further increase the field strength, and accordingly the continued back movement of the controller brings contacts $d^{10}$ $d^8$ into engagement with contacts $c^{10}$ $c^8$ on the controller, thereby short-circuiting resistances $r^4$, as will be seen on inspection of the third position of the controller. In the fourth position of the controller armature $A'$ is dropped from the circuit, the contact $d^4$ breaking the contact with the controller-contact $c^4$, and at the same time the field-magnet $F'$ of the same motor is short-circuited by contact $d^7$, which by wire 24 is connected to one side of magnet $F'$, coming into engagement with a controller-contact $c^7$, which is connected in the controller-cylinder to the contact $c^6$, engaging with contact $d^6$, which is connected to the other side of said field-magnet. At the same moment the resistances $r^3$ and $r^4$ are again included in the field-exciting circuit by reason of contacts $c^8$ $c^9$ $c^{10}$ leaving contacts $d^8$ $d^9$ $d^{10}$. Step No. 5 short-circuits armature $A'$ by reason of the engagement of the contacts $d^3$ $d^4$, connected, respectively, to opposite sides of said armature, with contacts $c^3$ $c^{14}$ of the controller, which are both connected to contact $c^5$ and are therefore connected together. The short circuit of the field of this armature is maintained during this step. The two last-mentioned steps are merely transitional, leading to the working point No. 6, which throws the motor-armatures in series, inserts resistances $r'$ $r^2$ in the armature-circuits, breaks the short circuit around field-magnet $F'$, and leaves resistances $r^3$ $r^4$ $r^5$ in the field-magnet circuit. The change from parallel to series is thus effected by the last three steps and is completed in step No. 6 by the opening of contact $c^3$ $d^3$, thus bringing armature $A'$ again into circuit. Its circuit now, however, instead of leading directly to ground is continued from contacts $d^4$ $c^{14}$ through the controller to contacts $c^5$ $d^5$, and thence through armature $A^2$ to ground. It will be seen that the armatures have thus been shifted from parallel to series connection without breaking circuit by the expedient of first short-circuiting the separately-excited field thereof, short-circuiting the armature by a connection which closes a series connection to the other armature, and finally rupturing the short-circuiting connection at the other side of the armature. At the same time the resistances $r'$ $r^2$ are put into the armature-circuit and resistances $r^3$ $r^4$ $r^5$ are left in the field-circuit. The armatures are now running in series with one another and with resistances and the field-magnets are lightly excited. The change from parallel to series may raise the counter electromotive force of the motor system, even with the fields thus weakened, to a point sufficient to overcome the line potential, and thus the braking action on the car may continue during this position, No. 6, and the following position, No. 7, which is similar in its connection, except that the resistances $r'$ $r^2$ are short-circuited by contacts $c^{11}$ $d'$ $c^{13}$ $d^3$. The next step, No. 8, reinserts resistance $r'$ into the circuit, but short-circuits resistance $r^3$ by contacts $c^{18}$ $d^8$ $c^{19}$ $d^9$, thus increasing the field strength of the motors and further increasing their counter electromotive force. The next position, No. 9, restores both resistances $r'$ $r^2$ to the armature-circuit by breaking contact at $c^2$ $d^2$ $c^{13}$ $d^3$ and short-circuits all of the resistances $r^3$ $r^4$ $r^5$ by contacts $c^{18}$ $d^8$ $c^{21}$ $d^{11}$, thus exciting the fields of the motors to the maximum strength, and this position thus gives the highest counter electromotive force attainable, so that when the car, as it continues to slow down, finally reaches a speed at which, even with the controller in this position, the counter electromotive force of the motors in series falls below the line electromotive force the limit of braking action by regeneration back into the line has been reached. It is therefore necessary to next break the circuit, as shown in position 10, where only the field-magnet circuit is maintained closed, the armature-circuit having been ruptured at contacts $c^{14}$ and $c^5$. Further braking of the car is now effected by turning the controller to position No. 11, wherein the resistance $r^3$ in the field-magnet circuit is short-circuited by contacts $c^{18}$ $d^8$ $c^{29}$ $d^9$, leaving the fields moderately strong, while both of the armatures $A'$ and $A^2$ are short-circuited by the sets of contacts $c^{23}$ $d^3$ $c^{24}$ $d^4$ and $c^{25}$ $d^5$ $c^{26}$ $d^6$, respectively. The armatures thus short-circuited under moderately strong fields give a powerful braking action, which may be further increased by shifting to the final braking position, 12, which simply cuts out all the resistances from the field-magnet circuit by contacts $c^{18}$ $d^8$ $c^{41}$ $d^{11}$, giving the maximum field intensity. The next step, 13, breaks all the circuits. The final step, 14, may be used when the current goes off the line or the trolley leaves the wire or when for any reason the car loses supply-current while in motion. In this position, No. 14, the armatures in series are connected to work through resistances $r'$ $r^2$ with their field-magnets in shunt connection, so that the motors act as shunt-wound dynamos. The load-circuit in this case may be traced from armature $A'$, through resistances $r'$ $r^2$, to contacts $d'$ $c^{31}$, and through the controller to contacts $c^{36}$ $d^6$ to armature $A^2$, thence through the armature to contacts $d^5$ $c^{35}$ $c^{34}$ $d^4$ of the controller, and thus back to armature $A'$. The exciting-circuit leads from armature $A'$ to contacts $d^3$ $c^{33}$ and through the controller to contacts $c^{38}$ $d^8$, and thence through the field-magnets $F^2$ $F'$ to the armature $A^2$, the circuit thence being completed through the armatures $A^2$ $A'$, as above described. The operation of the system in this position is to exert a braking action on the car, the energy given out being absorbed mostly by the resistances and the field-magnets being therefore subjected to less heating than in direct short-circuiting.

When the car is to be started from a position of rest, the controller is moved in reverse direction, no effect being produced until position No. 9 is reached, which is the first position that makes connection with the line, this connection being first made through resistances $r'$ $r^2$, which are then short-circuited on the further movements of the controller to positions 8 and 7. The steps No. 6, 5, 4, and 3 then shift the armatures from series to parallel, and steps 2 and 1 lower the field intensity, the effect of these successive changes being to produce a continued acceleration of the car, just as the reverse operation produced a continued retardation.

A signaling device—such as a bell $b$—is placed in a shunt connection 30 around one or other of the field-magnets $F'$ $F^2$, and the magnet of said bell is wound to respond only to currents of very high tension, so that it will ordinarily be inactive, but on the stopping of the supply-current from any cause, as by the trolley leaving the wire, the bell will be operated by the extra or induced current from the field-magnet $F^2$, thereby notifying the motorman that he has "lost current."

The separation and insulation of the trolley-wheels or line-connectors $t'$ $t$ for the armature and the field-magnet circuits, as shown in Fig. 1, have the effect that when the trolley leaves the wire it simultaneously breaks the connection between these two circuits, so that the flash or induced current from the field-magnets is expended at the trolley $t$ instead of in the armature, thus avoiding the risk of injuring the armature insulation. The same effect may be produced, as shown in Fig. 2, by dividing the trolley, both fork and wheel, by central insulation, the armature-current being taken off from one side $t^4$ and the field-magnet current from the other side $t^5$. This same principle may be applied to the usual line-switch, the same in that case having two separate contacts operated simultaneously from the field-magnet connection and the armature connection, respectively. On circuits of moderate potential, however, this feature need not be used, and in that case the ordinary trolley-wheel $T^2$ would be connected to both the field-magnet circuit 22 and armature-circuit 20, as indicated in Fig. 3.

Having thus described my invention, the following is what I claim as new therein and desire to secure by Letters Patent:

1. The method of braking electric cars consisting in changing the armatures of two electric motors propelling said car, from parallel to series connection, increasing the magnetization of the fields of said motors as the current in the armature decreases due to retardation of the speed of the motors, and then short-circuiting the armatures of the motors under separately-excited fields.

2. The method of braking electric cars consisting in changing the armatures of two electric motors propelling said car, from parallel to series connection, increasing the magnetization of the fields of said motors as the current in the armature decreases due to retardation of the speed of the motors, and then short-circuiting the armatures of the motors and varying the magnetic strength of the fields thereof.

3. The combination with a supply-circuit, of two motors supplied therefrom and having their field-magnets connected to said circuit by a connection independent of their armatures, and a controller having contacts and connections which in one position thereof, connect the armatures in parallel, in another position connect said armatures in series, and in an intermediate position short-circuit the field-magnet of one of the motors and also short-circuit the armature thereof.

4. In an electric-railway system, the combination with a supply-circuit, of two motors supplied therefrom, having their field-magnets connected to said circuit by a circuit independent of their armatures, and a controller comprising means for connecting said armatures in parallel, means for short-circuiting the field of one of said motors, means for closing a connection around the armature of that motor, and means for then opening the parallel connection so as to transfer the armatures from parallel to series connection without opening the circuit.

5. In an electric-railway system, the combination with a supply-circuit, of two motors supplied therefrom, having their field-magnets connected to said circuit by a circuit independent of their armatures, and a controller comprising means for connecting said armatures in parallel, means for short-circuiting the field of one of said motors, and simultaneously inserting compensating resistance in said circuit, means for closing a connection around the armature of that motor, and means for then opening the parallel connection so as to transfer the armatures from parallel to series connection without opening the circuit.

6. In an electric-railway system, the combination with a supply-circuit, of two motors supplied therefrom, having their field-magnets connected to said circuit by a connection independent of their armatures, and a controller comprising means for connecting said armatures in parallel, means for connecting said armatures in series, means for varying the strength of current in the field-magnet circuit, and means for short-circuiting the armatures, whereby the armatures may be shifted from series to parallel, and may afterward be short-circuited, while the strength of the motor-fields is in each case varied to increase the retarding action on the motors.

7. In an electric-railway system, the combination with a supply-circuit, of an electric motor supplied therefrom, means for disconnecting the said motor from the supply-circuit, a resistance and means for connecting the armature of said motor with said resistance and with its field-magnet in parallel connection so that when the supply-current ceases the motor may by this means be made to operate as a shunt-wound dynamo, driving current through said resistance.

8. In an electric-railway system, the combination with an electric-supply circuit, of two electric motors supplied therefrom, and having their field-magnets energized by a circuit independent of their armatures, and means for connecting said armatures in parallel and in series, means for varying the strength of the current in the field-magnet connection, and means for varying the resistance of the armature connection.

9. In an electric-railway system, the combination with an electric-supply circuit, and a motor supplied therefrom, of an electrical signaling device placed in a shunt around the field-magnet of said motor, and arranged to respond only to the high-tension current in said shunt, produced by discharge from said field-magnet when the supply-current ceases to flow.

10. In an electric-railway system, the combination with an electric-supply wire, of an electric motor having an armature and field-magnet and a trolley or moving connector having two contacts engaging with said supply-wire and connected respectively with the armature and field-magnet of said motor.

11. In an electric-railway system, the combination with a supply-circuit and an electric motor connected thereto having independent connections for its armature and field-magnet, of a connecting device interposed between the supply-circuit and the motor, said device having simultaneously-operated, but electrically separate contacts for disconnecting the motor and armature connections simultaneously from the line and from one another.

JOHN C. HENRY.

In presence of—
JAMES H. KILLON,
MARY HAMPTON LLOYD.